US012223804B1

(12) United States Patent
Roca

(10) Patent No.: US 12,223,804 B1
(45) Date of Patent: Feb. 11, 2025

(54) SYSTEM AND METHOD FOR ENABLING ONLINE USERS TO PLAY A TRIVIA GAME

(71) Applicant: Roman Roca, Hollywood, FL (US)

(72) Inventor: Roman Roca, Hollywood, FL (US)

( * ) Notice: Subject to any disclaimer, the term of this patent is extended or adjusted under 35 U.S.C. 154(b) by 113 days.

(21) Appl. No.: 17/752,181

(22) Filed: May 24, 2022

(51) Int. Cl.
*G07F 17/32* (2006.01)

(52) U.S. Cl.
CPC ...... *G07F 17/3276* (2013.01); *G07F 17/3225* (2013.01); *G07F 17/3246* (2013.01); *G07F 17/3295* (2013.01)

(58) Field of Classification Search
None
See application file for complete search history.

(56) References Cited

U.S. PATENT DOCUMENTS 5,813,913 A 9/1998 Bemer et al.
6,086,381 A 7/2000 Downs et al.
6,758,754 B1 7/2004 Lavanchy et al.
6,885,844 B2 4/2005 Roschelle et al.
7,076,434 B1 7/2006 Newnam et al.
7,192,352 B2 3/2007 Walker et al.
7,416,488 B2 8/2008 Peterson et al.
7,654,533 B2 2/2010 Seal
8,002,618 B1 8/2011 Lockton et al.
8,137,172 B2 3/2012 Lydon et al.
8,210,929 B2 7/2012 Baerlocher
8,277,325 B2 10/2012 Bortnik et al.
8,323,112 B2 12/2012 Bortnik et al.
8,348,737 B2 1/2013 Page
8,435,111 B2 6/2013 Filipour et al.
8,454,443 B2 6/2013 Bortnik et al.
8,554,612 B1 10/2013 Hernandez
8,622,798 B2 1/2014 Lockton et al.
8,684,807 B1 4/2014 Crici
8,888,576 B2 11/2014 Briggs et al.
8,926,423 B2 1/2015 Filipour et al.
8,968,067 B1 3/2015 Curtis et al.
8,974,278 B2 3/2015 Sama
9,233,293 B2 1/2016 Lockton
9,314,701 B2 4/2016 Lockton et al.
9,355,097 B2 5/2016 Bortnik et al.
9,367,543 B2 6/2016 Bortnik et al.
9,433,855 B1 9/2016 Keeker et al.
2003/0052456 A1 3/2003 Lasko et al.
2007/0057470 A1 3/2007 Mohr
2007/0243936 A1 10/2007 Binenstock et al.
(Continued)

*Primary Examiner* — Ronald Laneau
(74) *Attorney, Agent, or Firm* — Allen Dyer et al.

(57) ABSTRACT

A system and method configured to enable a plurality of users to play an online trivia game. The system comprises a plurality of user devices operably connected to a data network, a gaming platform and a server. Users may select a desired trivia level and wager and may be placed into groups of four platers. A computer-readable memory of the device and/or server is configured to execute a set of instructions that enable the gaming platform to: obtain the user information provided by each one of the plurality of users, create at least one group of four users of the same level, organize the at least one group in an initial tournament set, conduct multiple rounds of the trivia game in the at least one group and determine a winner of the at least one group, and eventually determine and give a reward to a last remaining winner.

21 Claims, 5 Drawing Sheets

(56) References Cited

U.S. PATENT DOCUMENTS

| | | | | |
|---|---|---|---|---|
| 2008/0146340 | A1 | 6/2008 | Ami | |
| 2008/0176618 | A1 | 7/2008 | Toompere | |
| 2008/0242423 | A1 | 10/2008 | Kerr et al. | |
| 2008/0254854 | A1 | 10/2008 | Slomiany | |
| 2009/0011397 | A1 | 1/2009 | Writer | |
| 2009/0054153 | A1 | 2/2009 | Abekasis et al. | |
| 2009/0146376 | A1* | 6/2009 | Green | A63F 3/00157 273/302 |
| 2009/0254430 | A1 | 10/2009 | Cherenson | |
| 2013/0116044 | A1 | 5/2013 | Schwartz | |
| 2013/0244784 | A1* | 9/2013 | Assa | G06F 1/1626 463/40 |
| 2014/0274333 | A1* | 9/2014 | Fine | G07F 17/3244 463/25 |
| 2020/0193779 | A1* | 6/2020 | Metz | G07F 17/3276 |

* cited by examiner

SYSTEM AND METHOD FOR ENABLING ONLINE USERS TO PLAY A TRIVIA GAME

FIELD OF INVENTION

The present invention relates to the field of online games and contests.

BACKGROUND

One of the major disadvantages of online gaming is the fact that it is generally difficult to gather groups of several online users to play online trivia games in an efficient and engaging manner. For example, some gaming platforms, which are enabled through mobile platforms such as smart phones and tablets, are not configured to allow users to conveniently place wagers and select between different levels of contests that can make the online games more fun and engaging. Part of the challenge in engaging users is the fact that numerous other platforms are unable to pair users according to a different levels of play, including in terms of monetary investment, time, difficulty, and commitment to any given online game. In addition, with existing online gaming platforms, it often times becomes frustrating to find a sufficient number of online participants to allow for online games to be conducted.

Based on the foregoing drawbacks, the online gaming industry would benefit by providing a simple and convenient way to access an online gaming platform that would provide users for the chance to earn a monetary reward based on a selected level of play, including monetary participation and a desired number of rounds, both of which could determine the amount of the reward for the winner. The industry would benefit if such an online gaming platform would be suited to group individuals in groups of four participants to conduct a single elimination game. It would be ideal if such an electronic gaming platform would comprise a library of trivia questions, with a random one being presented in each round of a game. As such, the first user in a group to answer the pending question correctly would win the group and advance to the next round or simply win the game if it is the last round.

SUMMARY

A. Overview of System

A system and method configured to enable a plurality of users to play an online trivia game. The system comprises a plurality of user devices operably connected to a data network, a gaming platform and a server. Each one of the plurality of devices is configured to receive user information comprising at least a trivia level and a wager, the gaming platform is configured to allow a user to input user information, including a selected wager and/or gaming level. The server is operatively configured with a data network to provide a data connection and data transmission between each one of the pluralities of user devices and the gaming platform. Each one of the plurality of user devices comprises a processor operably connected to the gaming platform and the server and each one of the plurality of user devices comprises computer-readable memory operatively connected the processor. The computer-readable memory is configured to execute a set of instructions that enable the gaming platform to: obtain the user information provided by each one of the plurality of users, create at least one group of four users of the same level, organize the at least one group in an initial tournament set, and conduct multiple rounds of the trivia game in the at least one group and determine a winner of the at least one group, and eventually determine a last remaining winner to whom a payout, reward or otherwise prize will be provided.

B. Overview of Method

As briefly mentioned above, the present invention is also directed to a method for allowing a plurality of users to play an online trivia game. The method may initially comprise providing a system as defined herein and using the device and the platform to obtain user information, including a desired playing level and/or a desired wager. Thereafter, the method may comprise using the platform and/or the devices to place users of the same selected level and wager in a waiting lobby. The method may also comprise creating groups of users of the same level and/or wager and organizing an initial tournament set. Thereafter, the method may comprise determining a winner of the initial round, and organizing the winners into a subsequent round group(s), and conducting subsequent rounds of the trivia game until there is a last remaining winner to whom a reward may be provided.

DETAILED DESCRIPTION

A. Overview of System

Figure 1:
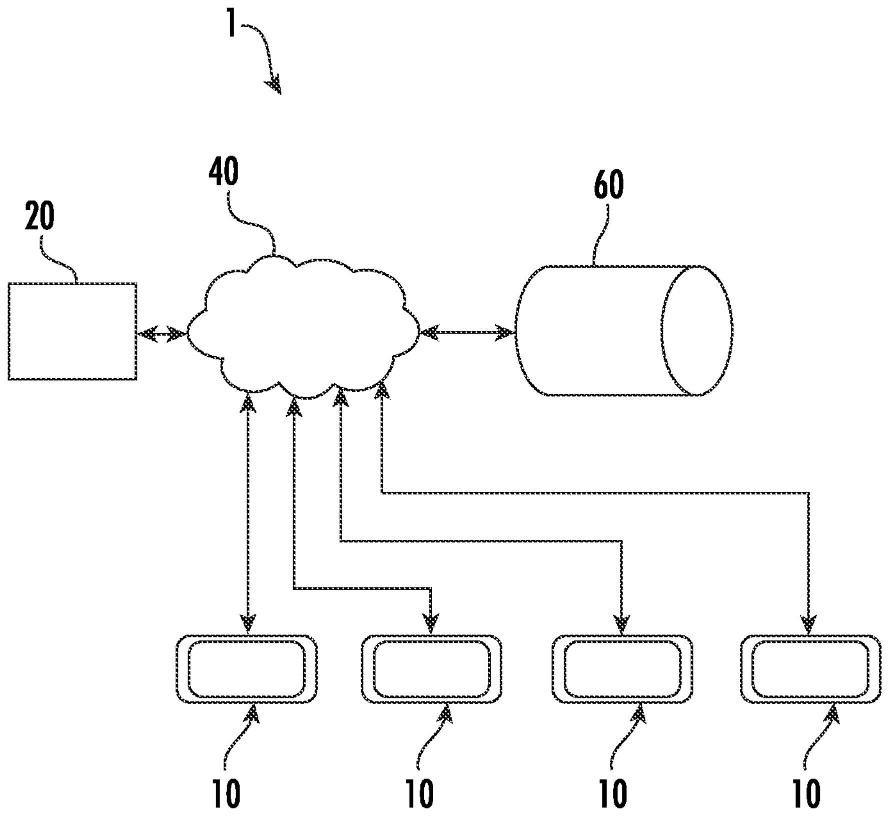
FIG. 1 is a schematic representation of the components of one embodiment the system according to the present invention.

With reference to FIG. 1, the present invention is directed to a system 1 and corresponding method 100 and/or 200 that enable multiple users to access a gaming platform 20 to play an online trivia game. With reference to FIG. 1, the system generally comprises a plurality of user or player devices 10, a data network 40, e.g., internet, ethernet, etc., a server 60 and a gaming platform 20. All of the plurality of player or user devices 10 should be operatively connected to a data network 40 and at least a portion of the data associated with implementing the inventive system 1 and method 100 and/or 200 may be uploaded to server 60 through the data network 20. As such, the server 60 and/or player devices 10 may comprise a database, i.e., memory capabilities operatively configured to store, sort, select, interpret, analyze, modify and/or edit all data associated each player or generally each tournament set, content, and/or other information as may be required and as will be explained herein. Conversely, the server 60 may be configured to provide a data connection and/or data transmission via the data network 40 between the devices 10 and/or the gaming platform 20. A processor(s) may also be provided, and may be operatively configured and/or otherwise connected to devices 10, the gaming platform 20 and/or the server 60, including, to execute a set of executable instructions or commands, i.e., executable computer code or software as defined herein, for the implementation of the operative features of the present invention. Similarly, such executable instructions or commands may be designed and/or configured to enable the platform to obtain and/or exchange the user or player information between the player or user device(s) 10.

The player devices 10 are generally configured to receive player information input by a player user or player and to visually implement various windows associated with the platform 20. The user devices 10 may generally comprise a programmable electronic device designed to accept data, perform prescribed mathematical and logical operations at real-time speed, including connected to a data network 40, and display the results of these operations. It is contemplated that the player or user devices 10 may be mobile devices, i.e., mobile telephones, smartphones, tablets, laptops, etc. The user devices 10 may also comprise other devices, e.g., mainframes, desktop computers, laptop computers, smart monitors, etc. As such, each user device 10 should comprise a screen that may display various windows of the platform, e.g., a mobile device screen, a monitor, television, display etc., as well as various selection mechanisms, i.e., a touch screen configured to ascertain selections, a mouse that may control a cursor and a clicking mechanism for making a selection, a keyboard, controller.

Each device 10 should generally comprise a system unit, or otherwise computer code with various operative hardware and/or software components operatively configured to process information including a central processing unit (CPU), or microprocessor. A memory component, e.g., random access memory (RAM) or similar, may be configured to temporarily store information that the CPU processes and/or interprets. Various other hardware components, i.e., cabling, may be operatively connected to into specific ports to interconnect the various other hardware components. Hardware that is not part of the system unit may be generally referred to as a peripheral device. The player devices 10 may also comprise one or more disk drives and/or devices that store information, e.g., hard disk drives, mobile storage devices, flash drives, CD, DVD drives, flash drives, floppy disk drives, etc. The player devices 10 may also comprise audio reproduction devices, i.e., speakers, headphones, earphones, etc., which may be accessed to provide audible guidance while playing the online trivia game. The device 10 may also comprise a modem, Bluetooth® capabilities, Wi-Fi, LAN, wired or other related capabilities, to connect to the data network 40 and/or server 60.

The gaming platform or simply platform 20 is generally configured to obtain information from the users. That is, the platform 20 is generally configured such that a client user may login and provide information relating to a particular service request. Similarly, the platform 20 may be configured so that a user may input information relating to its user profile, and a selected level and wager of the trivia game. The platform 20, may be accessed through an application via the user devices 10. For example, the platform 20 may be implemented via a downloadable mobile application that may be installed on a mobile device such as a smart or mobile telephone or a tablet. Alternatively, a user may access the planform 20 via a web browser, mobile browser, or another application or computer code that supports and/or enables the operative features of the present invention. Additionally, the platform 20 may be access via the user devices 10 via Bluetooth®, a Wi-Fi connection or via a wired LAN, and/or via Near-Field Communication (NFC) capabilities. Thus, a user should be able to access a device 10 in order to log onto the platform 20. Initially, the user may provide login to the platform 20 and create a profile, provide login credentials, provide payment information, etc. Thereafter, a user may provide information relating to a specific trivia game, e.g., a desired trivia level and a desired wager. Accordingly, the platform 20 may be configured to visually show different windows requesting such information and allowing the user to make desired selections.

The devices 10, data network 30, server 40 and/or underlying components thereof may be operatively configured with executable computer code to enable the storing, processing, interpretation, transmission and/or reproduction or otherwise display of information and data. The memory capabilities may comprise a storage unit(s), e.g., a hard disk or other storage hardware or device, as well as a network adapter. As used herein, computer software, or simply software, comprises executable instructions that direct a device 10, server 60 and/or attendant hardware and/or software, to perform specific instructions, commands or otherwise operations. Computer software may comprise computer programs, libraries and related non-executable data (including online documentation or digital media). In addition, executable code may comprise machine language instructions specific to an individual processor, for example, as may be associated with a user device(s) 10. An executable instruction may also cause, directly or indirectly, something to appear on a display of the device 10.

The devices 10 and/or server 60 may be provided with a processor configured to execute a set of programmable or otherwise predetermined executable instructions. Such instructions may be executed in a set order, unless a "jump" to a different instruction or an instruction interruption is involved. As an example, software may be written in machine code or in high-level programming languages that are translated into machine language using a compiler, an interpreter and/or combinations thereof. The executable instructions may also be written in a low-level assembly language. Assembly language may also be translated into machine language using an assembler. By way of example, the operative components of the inventive system, i.e., devices 10, server 60, platform 20, and/or attendant components, may be operatively configured with executable or interpretable computer code as defined herein. Such interpretable computer code may be provided in various computer programming languages, including, without limitation, C, C++, C#, Ruby, Java, Dart, Rust, MATLAB, Swift, PHP, Perl, HTML, and XHTML.

The system 1 according to the present invention may also comprise attendant hardware and/or software components that may be operatively configured with the devices 10, the data network 40, the server 60 and/or the platform 20. Such attendant hardware and/or software components may be provided to enable one or more of the operative features of the present invention, including capturing and/or interpreting user provided information and/or selections, including, user profile information, a selected level and/or wager, an area or category of trivia questions, an answer selection, etc. For example, the user devices 10 may comprise a screen, keyboard functions, and/or memory capabilities. These components may be operatively configured with the player devices 10 to enable one or more of the operative features of the present invention. As such, it is contemplated that a client device(s) 10 be configured to receive client information input by a use. Moreover, the devices 10, and/or the other operative components of the system, i.e., platform 20, data network 40 and/or server 60, should be cooperatively configured such that the information provided by the user(s) and should be accessible respectively by the player users as described herein.

Accordingly, and based on the foregoing operative framework of the inventive system, it is contemplated that the online trivia game according to the present invention be organized into an initial tournament set that comprises a plurality of first round groups 12 of four users or players 11. Is also contemplated that the plurality of first round groups comprise at least one group 12 of four players, but that additional groups may be added to the initial tournament set. Such additional groups 12 beyond the initial group 12 should be provided in multiples of four. In other words, in the initial round there may only be either one group 12 of four players 11, four groups 12 of four players, sixteen groups 12 of four players, etc., and up to sixty-five thousand five hundred and thirty-six groups 12 of four players per group 12. It is also within the scope of the present invention, that the total number of players 11 in the initial tournament set be at least four, which will be placed in one group 12. However, the number of players 11 in the initial tournament set may be up to two hundred eighty-two thousand one hundred and forty-four, which will be placed into sixty-five thousand five hundred and thirty six groups 12 of four players 11. However, additional numbers of groups 12 and or players 11 in multiples of four are also contemplated.

As such, it is contemplated that the users 11 will be able to select at least a level of the trivia game in which to participate. Generally, it is contemplated that there may be up to nine levels, although there may be more depending on the number of available online users 11 that may want to participate. For example, and as shown in the table below, the first level may comprise one group 12 of four players 11. The second level may comprise four groups 12 of sixteen players 11 total, and four players 11 per group 12. Successive levels may comprise the number of players 11 and groups 12 shown in the below table. As may be shown in the table below, any given level after the first level may comprise a total number of players and a total number of groups that is a multiple of four. For example, level 9 may comprise 262, 144 players 11 organized into 65,536 groups 12 of four players 11 each.

| Level/ Round | # of Players | # of Groups |
|---|---|---|
| 1 | 4 | 1 |
| 2 | 16 | 4 |
| 3 | 64 | 16 |
| 4 | 256 | 64 |
| 5 | 1024 | 256 |
| 6 | 4096 | 1024 |
| 7 | 16384 | 4096 |
| 8 | 65536 | 16384 |
| 9 | 282144 | 65536 |

Figure 2:
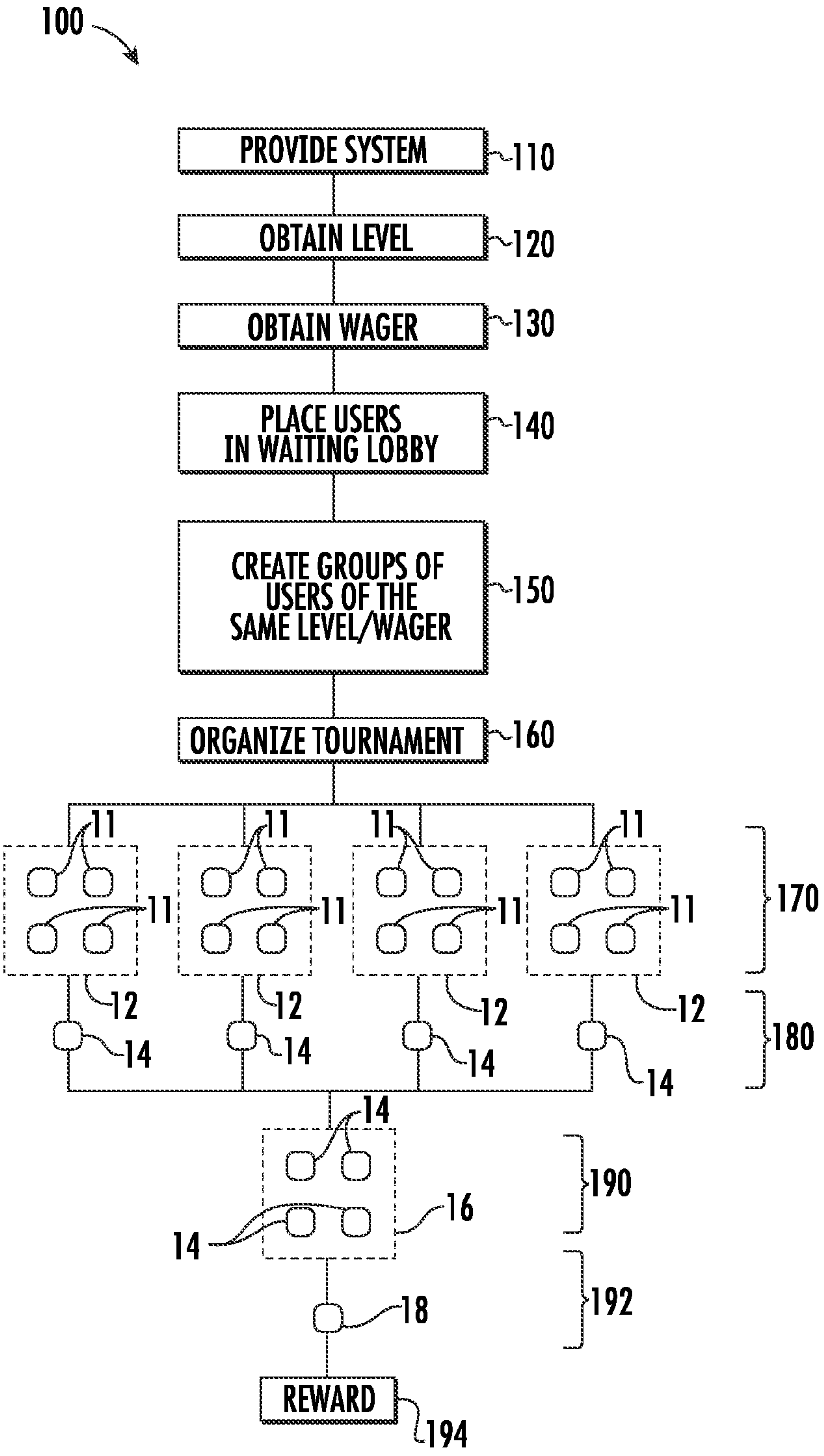
FIG. 2 is a flowchart representative of the steps of one embodiment the method according to the present invention and a graphical representation of the layout of an initial and subsequent tournament set.
Figure 3:
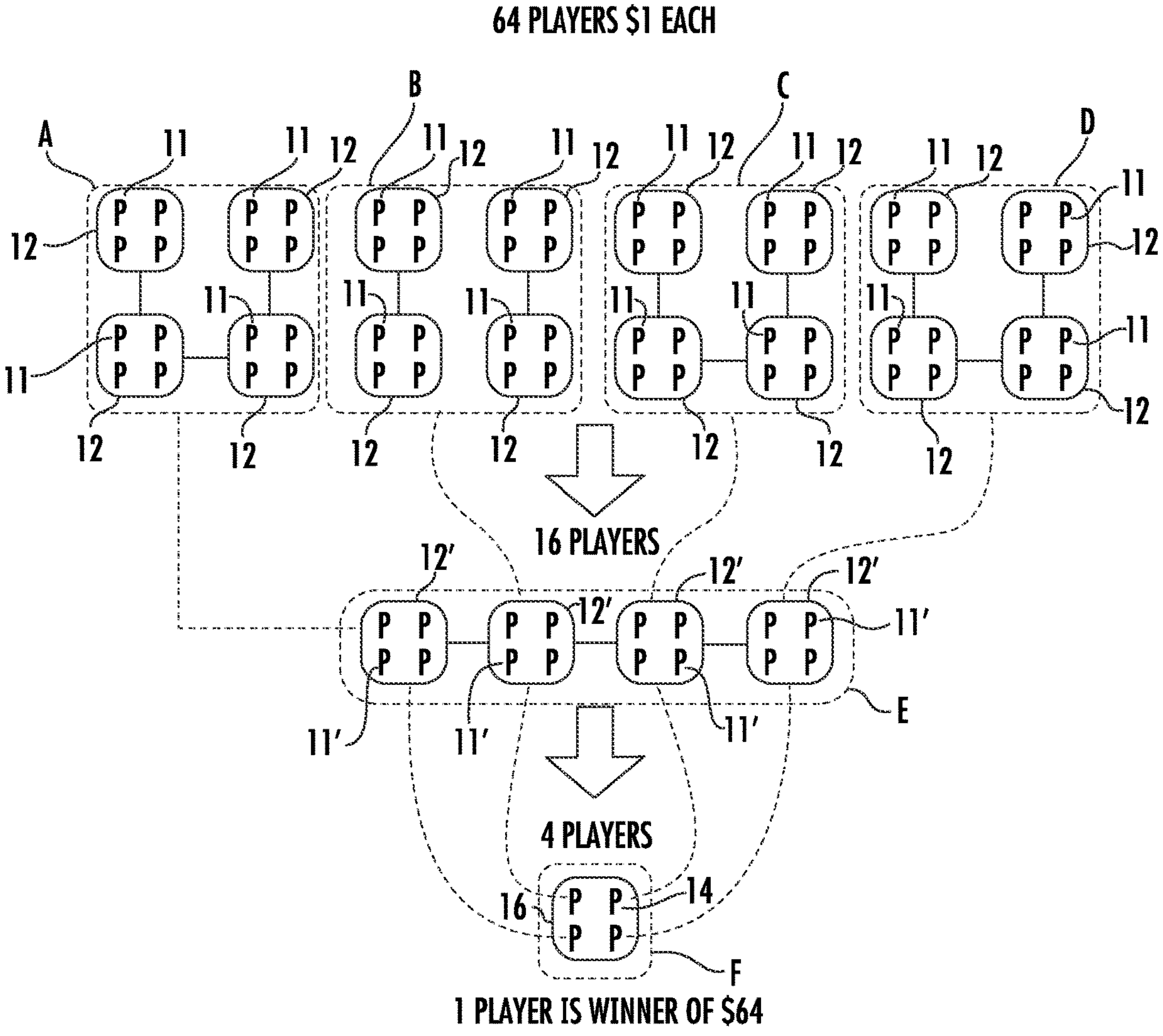
FIG. 3 is a schematic representation of at least a portion of one embodiment of an initial tournament set and subsequent rounds of the trivia game according to the present invention.

With reference to FIGS. 2-3, the online trivia game according to the invention may be implemented by organizing groups 12 four players 11 playing each other in a round(s) and/or level. Multiple rounds should be played until a final group 16 of four players 14 is reached. As used herein, a successive group 12' or successive plurality of groups 12' refers to at least one group 12' of four players 11', which are the winners of a corresponding group 12 from the preceding round/level. As represented in FIG. 3, an initial tournament set may comprise various sub-sets, i.e., indicated at A, B, C, and D, of groups 12 of players 11 that will play an initial round. The player 11' that wins each initial group 12, may be regrouped into a corresponding group 12' of winners 11 may be organized into subsequent tournament set or sub-set, i.e., indicated at E, which may comprise a number of groups 12' and winners that are a multiple of four, e.g., according to the table shown above. The winner 14 of each group 12' may be placed into a further subsequent group 16 of four winners 14, which would make up the final group 16 that will determine the winner of a given game 18. The last remaining winner should be given a reward.

Initially, the various components of the system 1, including the platform 20 will allow the user access to input information. For example, at an initial logging set of windows, the various users will be able to create an account and build a profile with information that may be stored in a player database. The information provided by the user should comprise contact information, the user's name or nick name, and payment information, i.e., credit card, bank account, payment services, etc., so that a user may deposit the necessary funds to place a wager(s) for any given trivia game. Once a user has provided such information and has a valid account and profile, the user may request to play an online trivia game. It should be understood that the user may be given various options with regard to the topic of the trivia game and may select between different trivia areas, i.e., geography, science, sports, history, etc. Alternatively, the user may be given the option to select a general knowledge category of trivia questions, and/or this may be a default choice if the user fails to specify a specific trivia area or category. The user will also be given the option to select a level of the trivia game and a specific wager. Generally, there may be up to nine levels of the trivia game, each one of which will involve a corresponding round of the trivia game. For example, if a user choses Level 9, the user will be placed in an initial group 12 of three other users 11 that also selected Level 9, and nine different rounds of the trivia games, i.e., nine trivia questions, are contemplated to determine the winner. If a user chooses Level 8, the user will be placed in an initial group 12 of three other users 11 that also selected Level 8. Similar, an initial arrangement or tournament set may be created according to the level selected by the user.

Generally, any given round of the trivia game will involve a window that is shown on the user devices 10 that shows a trivia question at the top and at least four multiple choice answers, with only one answer being the correct one. The system is generally configured to ascertain a winner of the group by determining the first user that selects the correct answer. This generally involves a real-time synchronization of multiple user accounts and/or devices 10, including their screens to determine the first user that selects, e.g., by tapping the correct answer on a touch screen of a mobile device 10 or selecting the right answer with a cursors. A user may also select further answers once the user has selected an initial answer. If at this point there is a user that selects the correct answer, the game will end and a group winner will be determined. However, if all of the players in a group select the wrong answer, then the system 1 will give all of the group users the ability to select another answer. This process may be repeated until at least one player selects the correct answer and is determined as the group winner.

After an initial group winner is determined, that winner may be given a reward if the user is the last remaining winner 18 of a tournament set. Alternatively, after a user wins any given group, irrespective of the round of the game, that user may be given the option to "cash in" and receive a lesser monetary reward than initially contemplated based on the level and wager, or the user may be given the option to keep playing. Further rounds of the game may be conducted in a similar fashion to determine a last group winner.

The following table may be referenced for a quick reference to the illustrative embodiments of the inventive system 1 and method 100 and/or 200, including wagers, payouts, number of players and number of groups.

| Level | Wager | Payout | Number of Players | Number of Groups |
|---|---|---|---|---|
| 9 | $3 | $786,432 | 262,144 | 65,536 |
| 9 | $2 | $524,288 | 262,144 | 65,536 |
| 9 | $1 | $262,144 | 262,144 | 65,536 |
| 8 | $3 | $196,608 | 65,536 | 16,384 |
| 8 | $2 | $131,072 | 65,536 | 16,384 |
| 8 | $1 | $65,536 | 65,536 | 16,384 |
| 7 | $3 | $49,152 | 16,384 | 4,096 |
| 7 | $2 | $32,768 | 16,384 | 4,096 |
| 7 | $1 | $16,384 | 16,384 | 4,096 |
| 6 | $3 | $12,288 | 4,096 | 1,024 |
| 6 | $2 | $8,192 | 4,096 | 1,024 |
| 6 | $1 | $4,096 | 4,096 | 1,024 |
| 5 | $3 | $3,072 | 1,024 | 256 |
| 5 | $2 | $2,048 | 1,024 | 256 |
| 5 | $1 | $1,024 | 1,024 | 256 |
| 4 | $3 | $768 | 256 | 64 |
| 4 | $2 | $512 | 256 | 64 |
| 4 | $1 | $256 | 256 | 64 |
| 3 | $3 | $192 | 64 | 16 |
| 3 | $2 | $128 | 64 | 16 |
| 3 | $1 | $64 | 64 | 16 |
| 2 | $3 | $48 | 16 | 4 |
| 2 | $2 | $32 | 16 | 4 |
| 2 | $1 | $16 | 16 | 4 |
| 1 | $3 | $12 | 4 | 1 |
| 1 | $2 | $8 | 4 | 1 |
| 1 | $1 | $4 | 4 | 1 |

B. Overview of Method

Figure 4:
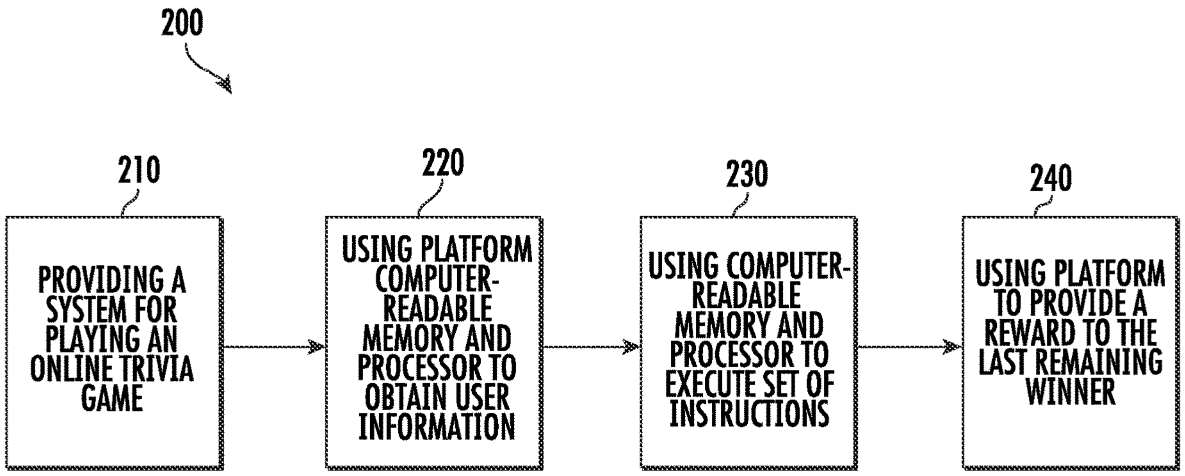
FIG. 4 is a diagrammatic representation of one embodiment of the method according to the present invention.
Figure 5:
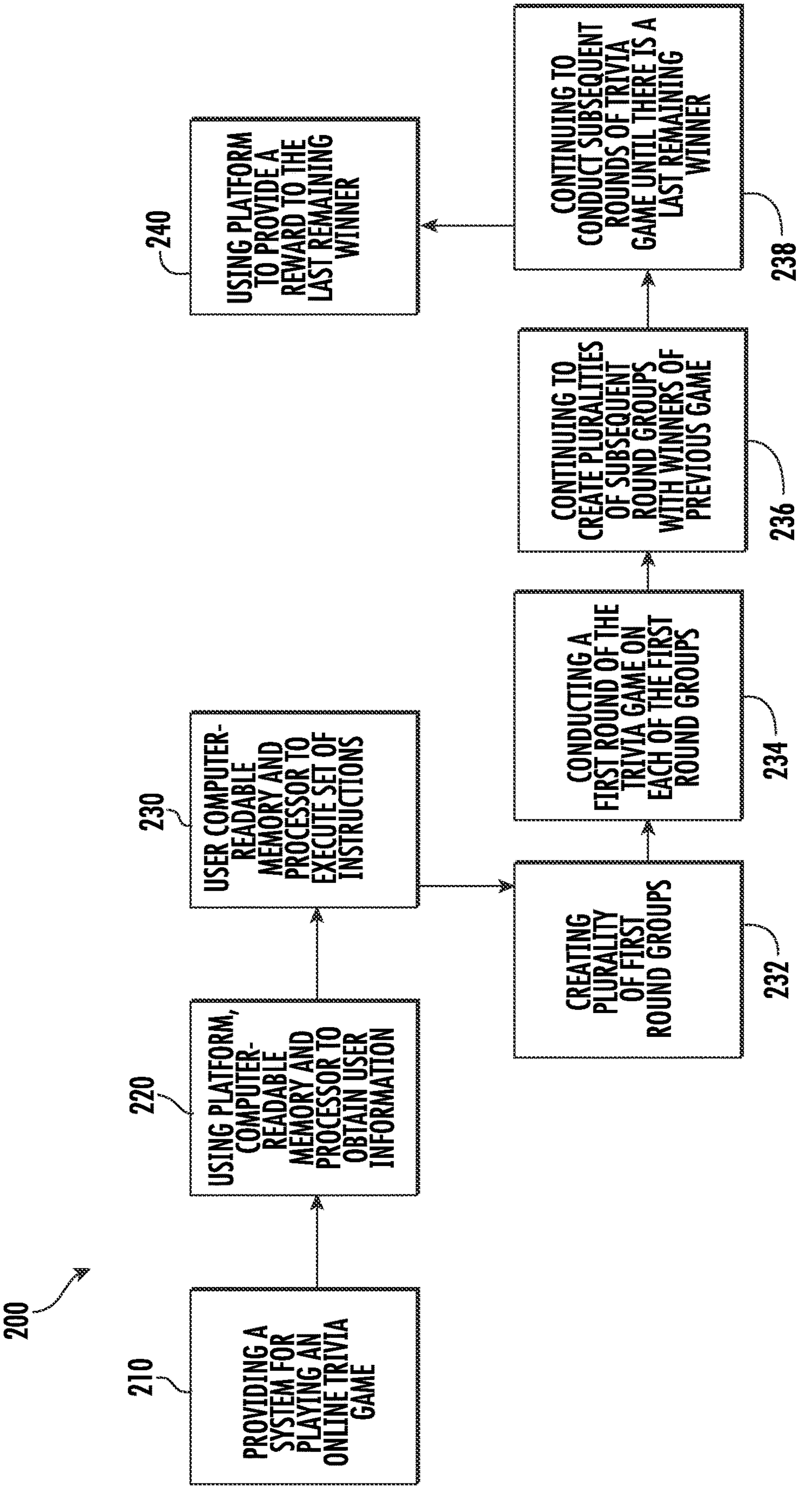
FIG. 5 is a diagrammatic representation of another embodiment of the method according to the present invention.

With reference now to at least FIG. 2 and FIGS. 4-5, and as briefly mentioned above, the present invention is also directed to a method 100 and/or 200 for allowing a plurality of users to play an online trivia game. As seen in FIG. 2, the method 100 may initially comprise providing a system 1 as defined herein. Thereafter, the method 100 may comprise using the device 10 and the platform 20 to obtain user information, including a desired playing level 120 and/or a desired wager 130. Thereafter, the method 100 may comprise using the platform 20 and the devices 10 to place users of the same selected level and wager in a waiting lobby 140. Thereafter, the method 100 may comprise creating groups of users of the same level and/or wager 150. Thereafter, the method 100 may comprise organizing an initial tournament set 160 with an initial plurality of groups 12 of four players 11 playing an initial round 170 of the trivia game. Thereafter, the method 100 may comprise determining a winner 14 of the initial round 170, and organizing the winners 14 into a subsequent round group(s) 16, which is indicated at 180. Thereafter a subsequent round 190 of the trivia game may be conducted and may be repeated until a last remaining winner 18 is determined, which is shown at 192. As shown at 192, a reward, prize of payout may be given to the last remaining winner 18.

As shown in FIGS. 4-5, the method 200 according to the present invention may comprise providing a system 1 as defined herein, which is shown at 210. As shown at 220, the method 200 may further comprise using the platform 20, and other components of the inventive system 1, e.g., the computer readable medium and the processor, to obtain user information. As shown at 230, the method 200 may further comprise using the computer readable memory and the processor to execute a set of instructions. As shown at 232 in FIG. 5, the method 200 may further comprise creating a plurality of first round groups 232. The method 200 may further comprise conducting a first round of the trivia game on each of the plurality of first round groups 234. Thereafter, the method 200 may further comprise continuing to create pluralities of subsequent round groups with winners of the previous game 236. As shown at 238, the method 200 may further comprise continuing to conduct subsequent rounds of the trivia game until there is a last remaining winner 18. As shown at 240 in FIGS. 4-5, thereafter, the method 200 may comprise using the platform 20 and/or the device(s) 10 to provide a reward to the last remaining winner 18.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system configured to enable a plurality of users to play an online trivia game, the system comprising:
- a plurality of user devices each one configured to receive user information comprising at least a trivia level and a wager,
- a gaming platform configured to obtain the user information;
- a server operatively configured with a data network to provide a data connection and data transmission between each one of the plurality of user devices and the gaming platform;
- each one of the plurality of user devices comprising a processor operably connected to the gaming platform and the server;
- each one of the plurality of user devices comprising a computer-readable memory operatively connected the processor,
- the computer-readable memory configured to execute a set of instructions that when executed, enable the gaming platform and the processor to:
  - obtain the user information provided by each one of the plurality of users and associated with a corresponding user account,
  - perform a real-time synchronization of all of the user accounts,
  - create at least one group of four users of the same level,
  - organize the at least one group in an initial tournament set, and
  - conduct a first round of the trivia game in the at least one group and determine a winner of the at least one group.

2. The system according to claim 1 wherein the executable instructions are further configured to enable the gaming platform to:
- obtain the user information provided by each one of the plurality of users,
- place each user in a user lobby according to a common selected level,
- the user lobby reaching at least four users of the common selected level, create at least one group of four users of the common selected level,
- organize the at least one group in an initial tournament set, and
- conduct a first round of the trivia game in the at least one group and determine a winner of the at least one group.

3. The system according to claim 1 wherein the executable instructions are configured to enable the gaming platform to:

obtain the user information provided by each one of the plurality of users, place each user in a user lobby according to a level and a wager selected by each user, upon the user lobby reaching at least four users of the same level and wager, create at least one group of four users of the same level, organize the at least one group in an initial tournament set, and conduct a first round of the trivia game in the at least one group and determine a winner of the at least one group.

4. The system according to claim 1 wherein the executable instructions are configured to enable the gaming platform to:

obtain the user information provided by each one of the plurality of users, create a plurality of first round groups each one comprising four users, the total number of groups within the plurality of first round groups being a multiple of four, conduct a first round of the trivia game in each one of the plurality of first round groups to determine a winner each of the plurality groups, create a plurality of subsequent round groups each one comprising four winners from the first round of the trivia game, conduct a subsequent round of the trivia game in the subsequent round of groups.

5. The system according to claim 1 wherein the executable instructions are configured to enable the gaming platform to:

obtain the user information provided by each one of the plurality of users, create a plurality of first round groups each one comprising four users, the total number of groups within the plurality of first round groups being a multiple of four, conduct a first round of the trivia game on each of the plurality of first round groups to determine a winner of each of the plurality first round groups, continue to create pluralities of subsequent round groups each one comprising four winners from the prior round of the trivia game, and continue to conduct subsequent rounds of the trivia game in each one of the plurality of subsequent round groups and continue to determine a winner for each of the plurality of groups of subsequent round groups.

6. The system according to claim 5 wherein the executable instructions are configured to enable the gaming platform to:

continue to conduct subsequent rounds of the trivia game in each one of the plurality of subsequent round groups and continue to determine a winner for each of the plurality of groups of subsequent round groups until there is a last remaining winner.

7. The system according to claim 5 wherein the plurality of first round groups comprises a total number of groups that is between four and sixty-five thousand five hundred and thirty-six.

8. The system according to claim 5 wherein the user information comprises between one and nine trivia levels; each one of the trivia levels associated with a corresponding round of the trivia game.

9. The system according to claim 5 wherein the total number of groups in the plurality of first round groups is four times the total number of groups in a subsequent plurality of groups.

10. The system according to claim 1 wherein the executable instructions are configured to enable the gaming platform to provide a reward to the winner that is proportional to the selected level and wager.

11. The system according to claim 1 wherein the selected wager may comprise either one currency unit, two currency units or three currency units.

12. A system configured to enable a plurality of users to play an online trivia game, the system comprising:

plurality of user devices each one configured to receive user information user information; the user information comprising:

between one and nine trivia levels; each one of the trivia levels associated with a corresponding round of the trivia game, a wager comprising either one currency unit, two currency units or three currency units, a gaming platform configured to obtain the user information;

a server operatively configured with a data network to provide a data connection and data transmission between each one of the plurality of user devices and the gaming platform;

each one of the plurality of user devices comprising a processor operably connected to the gaming platform and the server;

each one of the plurality of user devices comprising a computer-readable memory operatively connected the processor, the computer-readable memory configured to execute a set of instructions that when executed, enable the gaming platform and the processor to:

obtain the user information provided by each one of the plurality of users and associated with a corresponding user account, the information comprising a trivia level and a wager, perform a real-time synchronization of all of the user accounts, create a plurality of first round groups each one comprising four users, the total number of users within the plurality of first round groups being a multiple of four, conduct a first round of the trivia game on each of the plurality of first round groups to determine a winner of each of the plurality first round groups, continue to create pluralities of subsequent round groups each one comprising four winners from the prior round of the trivia game, continue to conduct subsequent rounds of the trivia game in each one of the plurality of subsequent round groups and continue to determine a winner for each of the plurality of groups of subsequent round groups until there is a last remaining winner, and a reward to the last remaining winner that is proportional to the selected level and wager.

13. A method configured to allowing a plurality of users to play an online trivia game, the method comprising:

using a gaming platform, a computer-readable memory and a processor of each one of a plurality of user devices to obtain the user information provided by each one of a plurality of users, using the computer-readable memory and the processor to execute a set of instructions comprising:

obtaining the user information provided by each one of the plurality of users and associated with a corresponding user account, performing a real-time synchronization of all of the user accounts, creating a plurality of first round groups each one comprising four users, the total number of groups within the plurality of first round users being a multiple of four, conducting a first round of the trivia game on each of the plurality of first round groups to determine a winner of each of the plurality first round groups, continuing to create pluralities of subsequent round groups each one comprising four winners from the prior round of the trivia game, and continuing to conduct subsequent rounds of the trivia game in each one of the plurality of subsequent round groups and continuing to determine a winner for each of the plurality of groups of subsequent round groups until there is a last remaining winner, each one of the plurality of user devices configured to receive the user information comprising a trivia level between one and nine and a wager, the gaming platform being configured to obtain and store the user information in a gaming database;

each one of the plurality of user devices comprising the processor operably connected to the gaming platform and a server;

the server configured to provide a data connection and data transmission between each one of the plurality of user devices and the gaming platform;

each one of the plurality of user devices comprising the computer-readable memory operatively connected the processor, the computer-readable memory and the processor cooperatively configured to execute a set of instructions.

14. The method as recited in claim 13 wherein the method further comprises using the gaming platform to provide a reward to the last remaining winner.

15. The method according to claim 13 wherein the plurality of first round groups comprises a total number of groups that is a multiple of four and that is between four and sixty five thousand five hundred and thirty six.

16. The method according to claim 13 wherein the user information comprises between one and nine trivia levels; the number of rounds associated with each trivial level being the same as the number associated with the level.

17. The method according to claim 13 wherein a first trivia level comprises one group of four users; each subsequent trivia level comprising groups of four users and a total number of groups that is four times less than the total number of groups of the preceding level.

18. The method according to claim 13 wherein the plurality of first round groups comprises a total number of groups that is a multiple of four.

19. The method according to claim 13 wherein the plurality of first round groups comprises a total number of users that is between sixteen and two hundred and eighty-two thousand one hundred and forty-four.

20. The method according to claim 13 wherein the selected wager may comprise one currency unit, two currency units or three currency units; the selected wager further configured to reward the last remaining winner with a reward that is proportional to the selected level and wager.

21. A system configured to enable a plurality of users to play an online trivia game, the system comprising:

a plurality of user devices each one configured to receive user information comprising at least a trivia level and a wager, a gaming platform configured to obtain the user information;

a server operatively configured with a data network to provide a data connection and data transmission between each one of the plurality of user devices and the gaming platform;

each one of the plurality of user devices comprising a processor operably connected to the gaming platform and the server;

each one of the plurality of user devices comprising a computer-readable memory operatively connected the processor, each one of the plurality of devices comprising a screen operatively connected to the processor and the gaming platform; the screen the processor and the gaming platform collectively configured to: display a trivia question and a plurality of answers on the screen, and allow each user to select one of the plurality of answers;

upon at least one of the plurality of users selecting a correct one of the plurality of answers, the processor being further configured to ascertain in real-time a winner associated with a device of the at least one of the plurality of users selecting the correct one of the plurality of answers;

the computer-readable memory configured to execute a set of instructions that when executed, enable the gaming platform and the processor to:

obtain the user information provided by each one of the plurality of users and associated with a corresponding user account, perform a real-time synchronization of all the user accounts and a real-time synchronization of all of the screens of each one of the plurality of devices, create a plurality of first round groups each one comprising four users, the total number of groups within the plurality of first round groups being a multiple of four, conduct a first round of the trivia game on each of the plurality of first round groups to determine a winner of each of the plurality first round groups, continue to create pluralities of subsequent round groups each one comprising four winners from the prior round of the trivia game, and continue to conduct subsequent rounds of the trivia game in each one of the plurality of subsequent round groups and continue to determine a winner for each of the plurality of groups of subsequent round groups.

* * * * *